US007400880B2

(12) United States Patent
Churt et al.

(10) Patent No.: US 7,400,880 B2
(45) Date of Patent: Jul. 15, 2008

(54) METHOD OF NOTIFYING AN APPARATUS IN A SYSTEM

(75) Inventors: Kerstin Churt, Hersbruck (DE); Ulrich Pöhler, Offenhausen (DE); Jürgen Zimmermann, Nürnberg (DE); Andreas Hanft, Nürnberg (DE)

(73) Assignee: Hydrometer Electronic GmbH, Nuremberg (DE)

(*) Notice: Subject to any disclaimer, the term of this patent is extended or adjusted under 35 U.S.C. 154(b) by 73 days.

(21) Appl. No.: 10/822,023

(22) Filed: Apr. 8, 2004

(65) Prior Publication Data

US 2004/0209599 A1 Oct. 21, 2004

(30) Foreign Application Priority Data

Apr. 17, 2003 (DE) ................................ 103 18 156

(51) Int. Cl.
*H04Q 7/20* (2006.01)

(52) U.S. Cl. ................. 455/412.2; 455/412.1; 455/557; 455/41.2; 455/41.3; 455/41.1; 455/421; 455/564; 340/870.01; 340/870.02; 340/870.03

(58) Field of Classification Search .............. 455/412.2, 455/557, 41.2, 41.3, 421, 41.1, 405, 561, 455/564; 340/870.02; 379/106.07
See application file for complete search history.

(56) References Cited

U.S. PATENT DOCUMENTS

| | | | | | |
|---|---|---|---|---|---|
| 4,940,976 | A | * | 7/1990 | Gastouniotis et al. | 340/870.02 |
| 5,010,568 | A | * | 4/1991 | Merriam et al. | 379/106.07 |
| 5,500,639 | A | | 3/1996 | Walley et al. | |
| 5,793,630 | A | * | 8/1998 | Theimer et al. | 700/11 |
| 6,195,018 | B1 | * | 2/2001 | Ragle et al. | 340/870.01 |
| 6,308,227 | B1 | | 10/2001 | Kumar et al. | |
| 6,369,719 | B1 | * | 4/2002 | Tracy et al. | 340/870.02 |
| 2002/0198028 | A1 | * | 12/2002 | Tsumura | 455/564 |
| 2003/0078030 | A1 | | 4/2003 | Churt | |
| 2003/0088681 | A1 | * | 5/2003 | Liscano et al. | 709/229 |
| 2003/0184448 | A1 | * | 10/2003 | Kagan | 340/870.28 |
| 2004/0087273 | A1 | * | 5/2004 | Perttila et al. | 455/41.2 |
| 2004/0137845 | A1 | * | 7/2004 | Vonheim et al. | 455/41.2 |
| 2008/0030368 | A1 | * | 2/2008 | Kagan | 340/870.02 |

FOREIGN PATENT DOCUMENTS

| | | | |
|---|---|---|---|
| AU | 0 565 801 | | 10/1987 |
| DE | 197 41 085 | C2 | 4/1999 |
| DE | 101 04 409 | A1 | 8/2002 |
| DE | 101 52 554 | A1 | 5/2003 |
| EP | 0 629 985 | A1 | 12/1994 |
| GB | 2 272 551 | A | 5/1994 |

* cited by examiner

*Primary Examiner*—David Q Nguyen
(74) *Attorney, Agent, or Firm*—Laurence A. Greenberg; Werner H. Stemer; Ralph E. Locher

(57) ABSTRACT

A method of announcing an apparatus to a system containing a central apparatus and at least one individual apparatus is distinguished in that the announcement is effected by optical communication, preferably in the infrared range. In that respective information about the apparatuses in the system is stored in the central apparatus.

14 Claims, 2 Drawing Sheets

METHOD OF NOTIFYING AN APPARATUS IN A SYSTEM

BACKGROUND OF THE INVENTION

Field of the Invention

The invention concerns a method of notifying an apparatus in a system, an apparatus for carrying out the method, and a system containing such apparatuses.

Such a system may be for example a data transmission radio network as is described in the commonly assigned, Published, Non-Prosecuted German Patent Application DE 101 52 554 A1, corresponding to U.S. patent Publication No. 20030078030 A1, which is not a prior publication. In that case, the central apparatus is a master data collector or capture device that is in radio communication with terminal apparatuses as individual apparatuses and with data collectors or capture devices that in turn are in radio communication with terminal apparatuses. The terminal apparatuses transmit data ascertained thereby, directly or by way of the data collectors to the master data collector where those data are then evaluated.

In order to construct such a system and keep it in operation, it is necessary to know, within the system (in the master data collector and/or in the data collectors), which apparatuses are present in the system overall. Therefore all apparatuses that are to be introduced into the system must first be notified to the system, that is to say announced thereto.

Announcing the subscribers to such a system has hitherto been implemented either by way of a portable computer connected directly to the central apparatus, such as for example a laptop or a handheld computer, in which case each apparatus to be notified or announced must be inputted manually into the portable computer and then transmitted to the central apparatus.

It is also known in radio networks to implement announcement of the subscribers to the system by radio. That however suffers from the disadvantage that, because of the relatively great radio range, an apparatus that is to be announced can be announced simultaneously to a plurality of data collectors. In order to be able to prevent that, all other apparatuses in question must first be screened or switched off before the announcement procedure can take place, and in the case of relatively large systems that involves a not inconsiderable amount of complication and expenditure.

SUMMARY OF THE INVENTION

It is accordingly an object of the invention to provide a method of notifying an apparatus in a system which overcome the above-mentioned disadvantages of the prior art devices and methods of this general type, with which the announcement of an apparatus in the system is possible in a simplified manner.

With the foregoing and other objects in view there is provided, in accordance with the invention, a method of announcing an individual apparatus to a system containing a central apparatus. The method includes announcing the individual apparatus to the system using optical communication, and storing information about the individual apparatus in the system in the central apparatus.

The core of the invention provides that the notification (announcement) of an apparatus in a system containing a central apparatus and at least one individual apparatus is effected by optical communication—preferably in the infrared range. In this respect the notification procedure can be affected alternatively or also cumulatively to the central apparatus or by way of an intermediary apparatus that is already notified to the central apparatus, wherein, in the latter case, notification of an apparatus to the intermediary apparatus is preferably forwarded to the central apparatus.

The advantage of optical communication for notification of the apparatuses to be announced to the system is that the method is simple, it is possible without the use of an additional tool and it can also be carried out by personnel who have not been especially trained. In addition this method ensures that the subscribers are clearly established in the system.

In an advantageous configuration optical communication is effected unidirectionally from the apparatus that is to be notified to the apparatus that is to register the notification.

A development of the invention provides that, after successful notification, a confirmation signal is outputted, which is preferably affected acoustically. The confirmation signal can be delivered by the apparatus registering the notification and/or the central apparatus. That confirmation signal gives the user of the system a positive feedback message when notification has been successful.

An embodiment of the invention provides that the system is a data acquisition and data collection system, preferably a consumption data acquisition and collection system. It can also be in the form of a radio network.

An apparatus for carrying out the specified method has an optical interface with which the optical communication can be effected. A system that already contains at least two such apparatuses can be constructed in such a way that the first apparatus represents the central apparatus and the second apparatus represents an individual apparatus or an intermediary apparatus, the apparatuses communicating with each other by way of their optical interfaces. A system containing at least three apparatuses has the central apparatus as a first apparatus, an individual apparatus as a second apparatus and an intermediary apparatus as a third apparatus, wherein the intermediary apparatus communicates with the central apparatus by way of the optical interfaces while the individual apparatus communicates with the intermediary apparatus by way of the respective optical interfaces.

In an embodiment of the invention the system is a data acquisition and data collection system that is preferably in the form of a consumption data acquisition and collection system, wherein the central apparatus is a master data collector, the intermediary apparatus is a data collector and the individual apparatus is a terminal apparatus. In that case communication of the detected and collected data is effected between the apparatuses preferably by way of radio.

Separation of the communication paths for notification of the subscribing apparatuses on the one hand and normal data transmission operation on the other hand provides that the two modes of operation do not interfere with each other, even if—if for example an additional apparatus is later added during normal operation of the system—the operating modes take place simultaneously in mutually juxtaposed relationship.

Other features which are considered as characteristic for the invention are set forth in the appended claims.

Although the invention is illustrated and described herein as embodied in a method of notifying an apparatus in a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
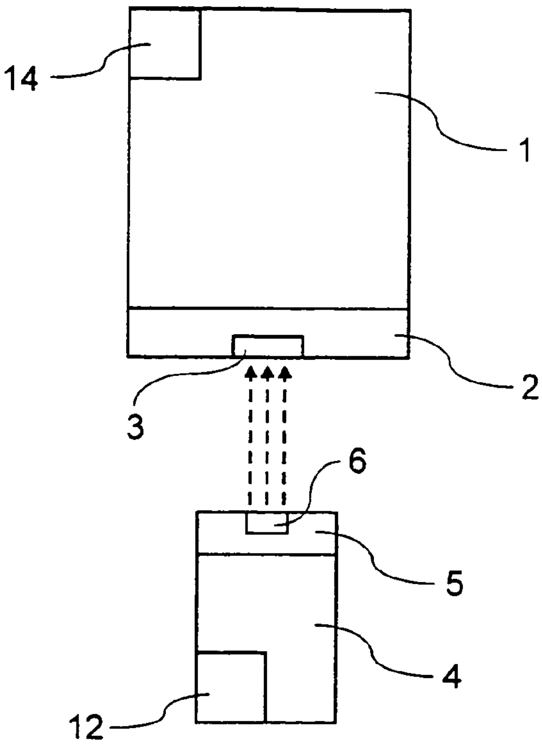
FIG. 1 is an illustration showing an announcement of a terminal apparatus to a master data collector according to the invention.

Referring now to the figures of the drawing in detail and first, particularly, to FIG. 1 thereof, there is shown a master data collector 1 that has an infrared interface 2 with an infrared receiver 3 (for example an IR photocell or photodiode). A terminal apparatus 4 also has an infrared interface 5 that has an infrared transmitter 6 (for example an IR light emitting diode).

Figure 3:
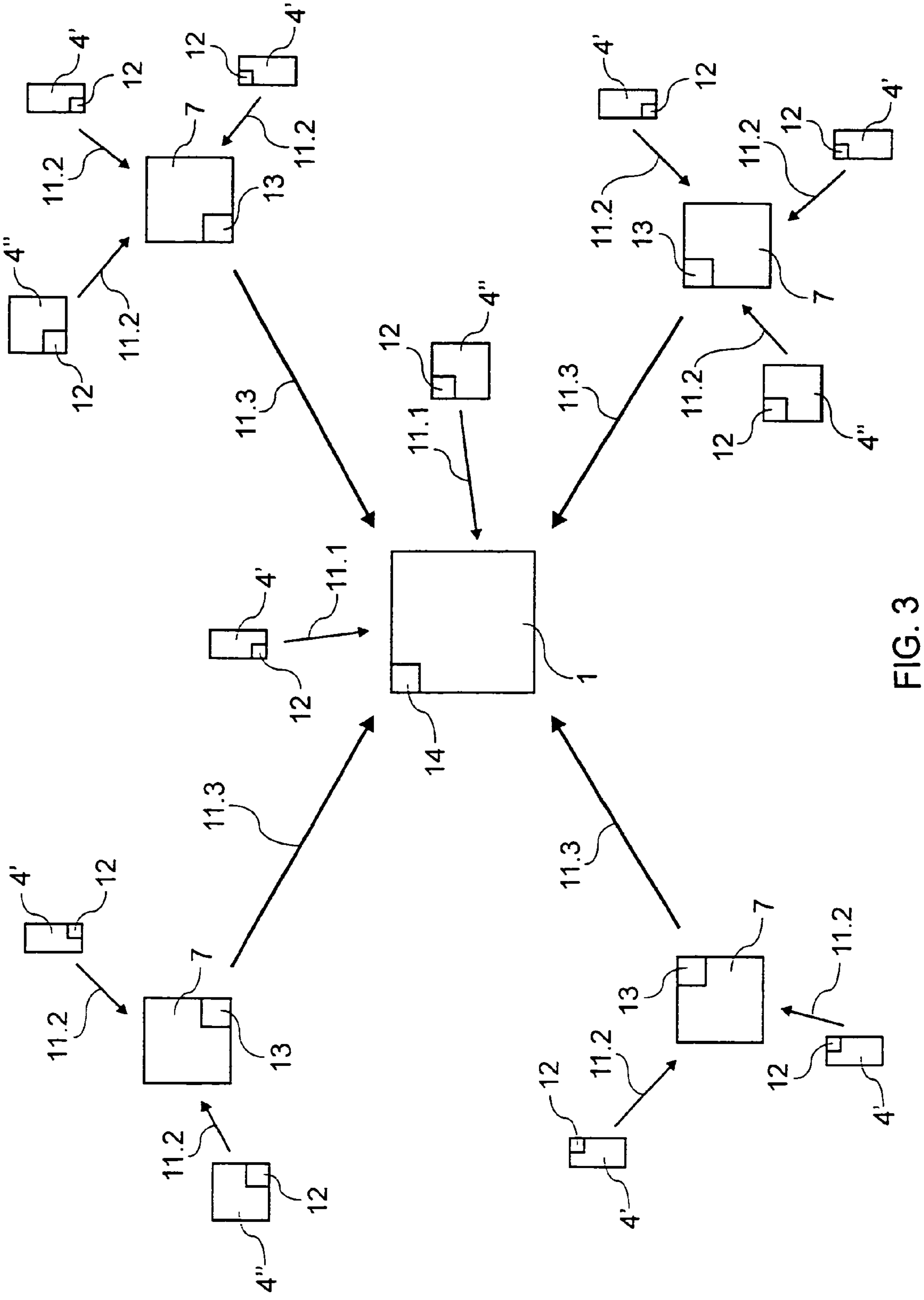
FIG. 3 is an illustration of a data transmission radio network containing the apparatuses.

The master data collector 1 is the central apparatus of a data transmission radio network to be constructed (see also FIG. 3). Information as to which apparatuses belong to the radio network must be stored therein so that in operation it can evaluate the data of all subscribers belonging to the radio network (but also only those actually belonging to the radio network). For that purpose each apparatus that is to belong to the radio network must be announced therein. For that purpose each terminal apparatus 4 is held in front of the master data collector 1 in such a way that the infrared transmitter 6 of the terminal apparatus 4 and the infrared receiver 3 of the master data collector 1 are opposite to each other. When a button is pressed (or when another initialization method is executed) the infrared transmitter 6 of the terminal apparatus 4 sends infrared signals to the infrared receiver 3 of the master data collector 1. The latter evaluates the signals and stores the information about the terminal apparatus 4 that has now been announced, in an internal memory. After a successful announcement, an acoustic confirmation signal sounds, which is produced by a buzzer disposed in the master data collector 1.

In the same way data collectors 7 with an optical interface 8 and an infrared transmitter 9 can also be announced to the master data collector 1.

Figure 2A:
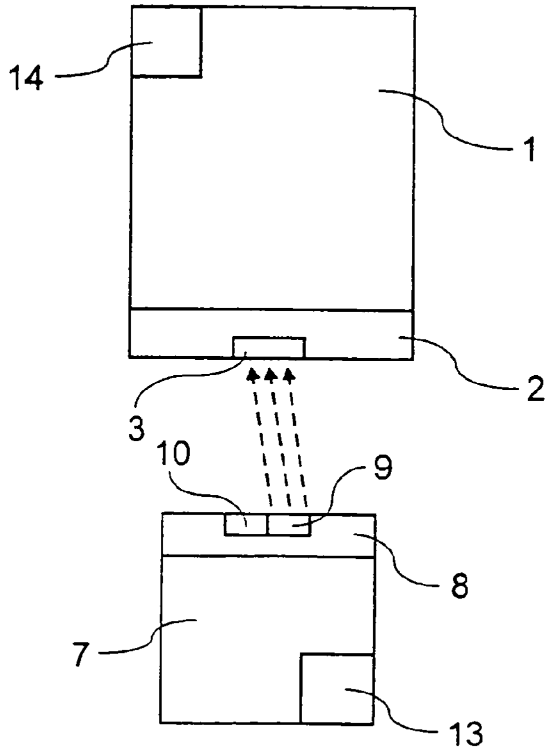
FIG. 2A is an illustration showing the announcement of a data collector to the master data collector.
Figure 2B:
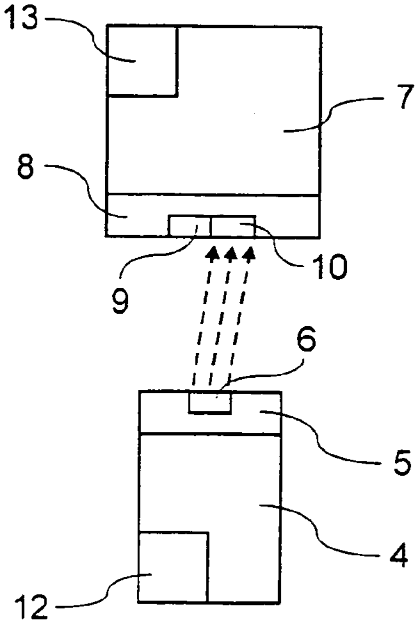
FIG. 2B is an illustration showing the announcement of a terminal apparatus to the data collector.

In accordance with a second embodiment only the data collectors 7 are announced to the master data collector 1 (see FIG. 2A). The terminal apparatuses 4 are in turn announced to the data collectors 7 with which they are to be later associated in normal operation (see FIG. 2B and hereinafter). For that purpose, in its optical interface 8, besides an infrared transmitter 9, the data collector 7 also has an infrared receiver 10. The information communicated by the terminal apparatus 4 is stored in the data collector 7 and/or passed by radio transmission to the master data collector 1 where it is stored in the memory thereof. In this case also, after a successful announcement, an acoustic confirmation signal sounds, which is produced by a buzzer in the data collector 7 and/or in the master data collector 1.

Accordingly in accordance with the invention it is possible that the information about the apparatuses participating in the radio network is present only in the master data collector 1, that it is in part also present in the data collectors 7 or that the information in respect of the participating data collectors is present in the master data collector 1 and the information in respect of the respective terminal apparatuses announced to the data collectors 7 and associated therewith is present therein. At any event however the apparatuses that participate in the radio network are established therein.

It should be noted here that, after an announcement has been implemented, the radio communication between the individual apparatuses must be implemented separately.

FIG. 3 is a view showing in principle a data transmission radio network that is initialized in the described manner. Here heating cost distributors 4' and water meters 4" function as the terminal apparatuses 4. Further terminal apparatuses 4 in such a data acquisition system can be electricity meters, gas meters and the like. The terminal apparatuses 4', 4" send the consumption data directly to the master data collector 1 (radio paths 11.1) or first to the data collectors 7 (radio paths 11.2) from where they are collected or transmitted successively to the master data collector 1 (radio path 11.3). In that way all consumption data go to the master data collector 1 where they can be evaluated and subjected to further processing.

In order to be able to participate in the radio communication the terminal apparatuses 4' and 4" have radio modules 12 with a transmitter, the data collectors 7 have radio modules 13 with a transmitter and a receiver and the master data collector 1 has a radio module 14 with a receiver.

The association of the terminal apparatuses 4 with data collectors 7 or directly with the master data collector 1 can be effected in such a way that the terminal apparatuses 4 are associated with those apparatuses to which they were announced. Alternatively or also cumulatively however the association can also be implemented using the method described in above-mentioned Published, Non-Prosecuted German Patent Application DE 101 52 554 A1, corresponding to U.S. patent Publication No. 20030078030 A1, the disclosure of which is hereby completely incorporated herein.

In the case of small radio networks the use of data collectors 7 can be superfluous so that the terminal apparatuses 4 are always announced directly to the master data collector 1 and in operation also only send data thereto. In contrast, in the case of very large data networks, the use of data transceivers may be necessary which receive data from the data collectors 7 and forward it to the master data collector 1. It will be appreciated that those data transceivers must be configured in the same manner as the data collectors 7 and announced in the radio network.

Data transmission both in the announcement method and also in radio operation of the network can be effected serially or also parallel. Optical communication for announcing or notifying the subscribers to the system includes the visible, infrared and ultra-violet ranges.

This application claims the priority, under 35 U.S.C. § 119, of German patent application No. 103 18 156.3, filed Apr. 17, 2003; the entire disclosure of the prior application is herewith incorporated by reference.

We claim:

1. A method of announcing an individual apparatus to a system containing a central apparatus, which comprises the steps of:

announcing the individual apparatus to the system using exclusively optical communication;

storing information about the individual apparatus in the system in the central apparatus;

after completing the announcing step, outputting a confirmation signal by at least one of an apparatus registering the announcing and the central apparatus; and after completing the announcing step, the individual apparatus communicating further information only through radio communications.

2. The method according to claim 1, wherein the announcing is effected to the central apparatus.

3. The method according to claim 1, which further comprises performing the optical communication unidirectionally from the individual apparatus doing the announcing to an apparatus for registering the announcing.

4. The method according to claim 1, which further comprises forming the system as a radio network.

5. The method according to claim 1, which further comprises forming the system as a data acquisition and data collection system.

6. The method according to claim 1, which further comprises performing the optical communication in an infrared range.

7. The method according to claim 1, which further comprises forming the system as a consumption data acquisition and collection system reporting information relating to at least one of electricity consumption, water consumption, gas consumption and heat cost data.

8. A method of announcing an individual apparatus to a system containing a central apparatus, which comprises the steps of:

announcing the individual apparatus to the system using exclusively optical communication;

storing information about the individual apparatus in the system in the central apparatus;

after completing the announcing step, the individual apparatus communicating further information only through radio communications; announcing an intermediary apparatus to the central apparatus; announcing the individual apparatus to the intermediary apparatus resulting in an announcement; and forwarding the announcement of the individual apparatus from the intermediary apparatus to the central apparatus.

9. A system, comprising:

a first apparatus being a central apparatus having a first optical interface for performing optical communication and a first radio module; and a second apparatus selected from the group consisting of an individual apparatus and an intermediary apparatus and having a second optical interface for performing optical communication with said first optical interface, the optical communication only providing information about said second apparatus for announcing a presence of said second apparatus to said first apparatus, said second apparatus having a second radio module for transmitting further information to said first apparatus, after said second apparatus announces its presence to said first apparatus, said first apparatus outputting a confirmation signal.

10. The system according to claim 9, wherein:

the system is a data acquisition and data collection system; said central apparatus is a master data collector; said intermediary apparatus is a data collector; and said individual apparatus is a terminal apparatus and data communication between said apparatuses is effected by way of radio.

11. The system according to claim 10, wherein the system is a consumption data acquisition and collection system reporting information relating to at least one of electricity consumption, water consumption, gas consumption and heat cost data.

12. A system, comprising:

a first apparatus being a central apparatus having a first optical interface for performing optical communication;

a second apparatus being an individual apparatus and having a second optical interface for performing optical communication; and a third apparatus being an intermediary apparatus and having a third optical interface for performing optical communication, said third optical interface communicating with said first and second optical interfaces, the optical communication providing information about said second and third apparatuses for announcing a presence of said second and third apparatuses to said first apparatus.

13. The system according to claim 12, wherein:

the system is a data acquisition and data collection system; said central apparatus is a master data collector; said intermediary apparatus is a data collector; and said individual apparatus is a terminal apparatus and data communication between said first, second and third apparatuses is effected by way of radio.

14. The system according to claim 12, wherein the system is a consumption data acquisition and collection system reporting information relating to at least one of electricity consumption, water consumption, gas consumption and heat cost data.

* * * * *